United States Patent Office.

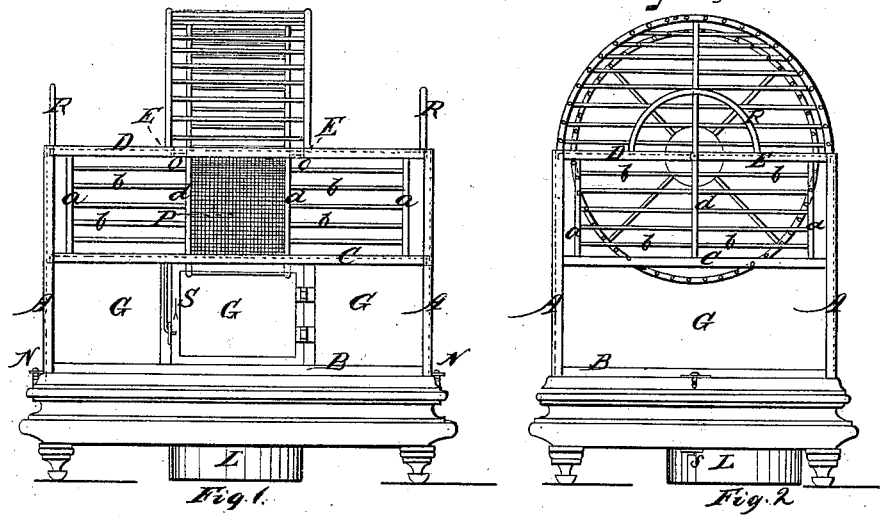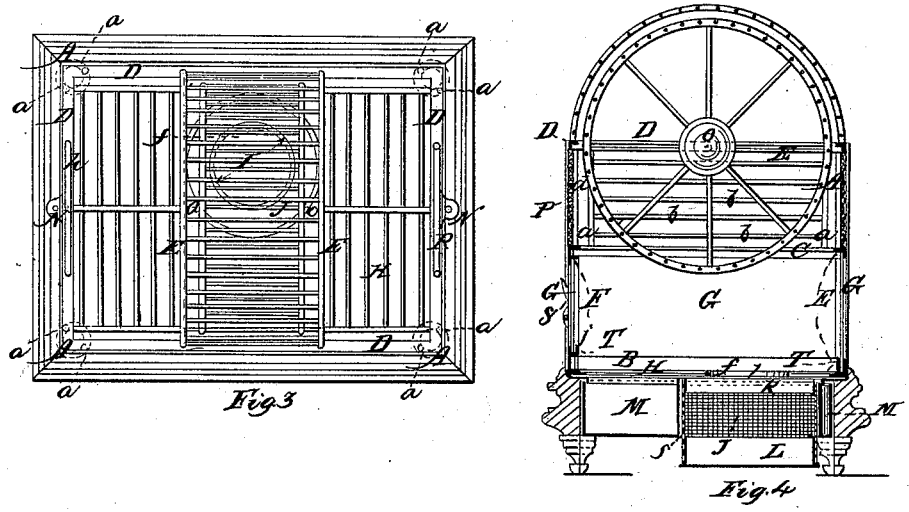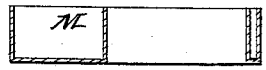

CHARLES L. OSBORN, OF NEW YORK, N. Y.

Letters Patent No. 80,561, dated August 4, 1868; antedated July 20, 1868.

IMPROVED BIRD-CAGE.

*The Schedule referred to in these Letters Patent and making part of the same.*

TO ALL WHOM IT MAY CONCERN:

Be it known that I, CHARLES L. OSBORN, of the city, county, and State of New York, have invented certain new and useful Improvements in Cages; and I do hereby declare the following to be a full, clear, and exact description thereof, reference being had to the accompanying drawings, and to the letters of reference marked thereon, in which—

Figure 1 is a side elevation of my improved cage.

Figure 2 is an end elevation of the same.

Figure 3 is a plan or top view of my improved cage.

Figure 4 is a vertical transverse section of my cage on the line $y\ y'$.

Figure 5 is a view in detail, being a transverse section of the bottom garbage-pan of my cage.

The object of my invention is to furnish a cage for the reception of small animals, such as are commonly kept as pets and domesticated in families, that shall be strong and durable, and at the same time combine utility with convenience.

My invention consists in constructing the sills, posts, girts, plates, and cross-ties of these cages, of strips or pieces of spring-brass, or any other suitable metal, whose cross-section is in shape like the letter L.

Another part of my invention consists in making the lower part of the sides of the cage of glass, the construction of which will be more fully hereinafter described, the object of which is to keep particles of food or any uncleanness from being scattered on the floor.

And still another part of my invention consists in making (in cages where the necessities of the case demand it) a nest or sleeping-place below the surface of the floor of the cage, which gives to the animal occupying the cage more room above-board to run about.

General Description.

In the drawings, A A are the posts; B B are the sills; C C are the girts; D D are the plates; E E are the cross-ties, all of which are made of spring-brass or any other suitable metal.

The cross-section of these pieces is shaped in the form of an L, as may be seen in the sectional drawing, fig. 4. The framework of the cage, when made in this way, presents a strong, enduring, and elegant specimen of construction.

The upper part of the cage, between the plates D D and girts C C, is panelled off, as shown in the drawings, by two vertical rods, $a\ a$, made of stout wire, being placed in each corner of the cage. From these the horizontal wires $b\ b$ connect with other vertical rods, $d\ d$, the whole forming a firm but simple net-work of bracing throughout the cage.

The lower part of the cage is made of glass, of the proper thickness, and is secured between the girts C C and sills B B, in the manner shown in the drawings, at F F, in fig. 4.

T T is a narrow strip of metal soldered on to the sills B B, and forms a groove, wherein the glass, G, is firmly puttied or otherwise secured.

H is the bottom of the cage, which is made of coarse wire cloth. A hole, I, is cut out of this wire cloth, and is properly surmounted by a wire rim, $f$, which is soldered to said wire cloth. This hole I communicates with a nest or sleeping-compartment, J, which consists of a box made with two rims or collars, K and L, one at the top, the other forming a bottom, respectively; the parts K and L being connected by a piece of gauze-wire cloth wrapped around said parts K and L, and soldered thereto. This makes a cozy little shelter for the animal, wherein it can sleep or breed, as the case may be, with the advantage of being entirely out of the way.

The bottom of the cage is provided with a pan, M, which can be attached and detached from underneath the cage. This pan affords an easy and expeditious means of cleansing the cage when occasion requires it. The pan M is secured to the bottom of the cage by the button S S on the under side of the cage, and is made deep enough to little more than cover the bottom piece, L, of the nest J.

The gauze part of the nest is protected or covered by the pan M, which surrounds it in the manner of a fender, leaving a little space of air, whereby the nest is ventilated and kept from getting foul and emitting unpleasant odors. A transverse section of the pan is shown in detail at fig. 5.

The upper part of the cage is provided with a revolving wheel, working on the centres O O, opposite to which are placed, in front and rear, square pieces of fine gauze-wire cloth, P P, which act as guards to prevent any scattering of food, dirt, &c., through the centrifugal tendency of such particles caused by the rapid revolution of the wheel by the animal within.

The cage is mounted on a moulded base, and is secured thereto by the screws N N.

R R are two wire handles soldered to the plate D D, by which the cage can be transferred from place to place.

A glass door, with suitable fastenings, is shown at S.

The cage shown in the drawings is intended for a squirrel, or any other animal of similar habits and stature, but it is obvious that the same general construction is equally applicable to the wants of birds, all that is necessary to do being to dispense with the revoving wheel, and introduce proper means whereby the animal may be fed and watered.

Having thus described my said invention, what I claim, and desire to secure by Letters Patent, is—

1. The combination, in a cage, of the sills, posts, plates, girts, cross-ties, &c., constructed as described, with the glass sides, substantially as herein specified.

2. The nest or sleeping-compartment J, constructed below the surface of the floor of the cage, substantially as described, when used for the purpose set forth.

CHARLES L. OSBORN.

Witnesses:
 CHAS. EDW. HARE,
 A. B. SIMONDS.